May 24, 1927.
C. STOLLBERG
1,629,551
COUPLING FOR RAILWAY CARS
Filed Jan. 23, 1926
2 Sheets-Sheet 1
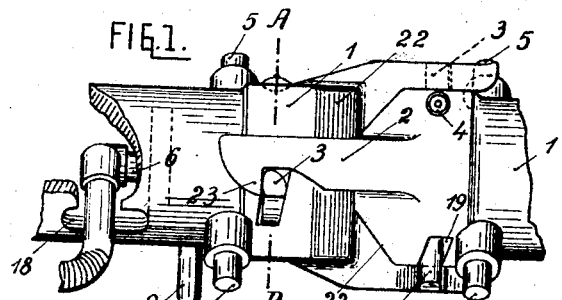
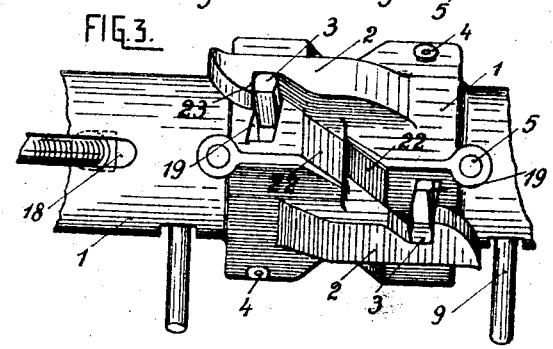
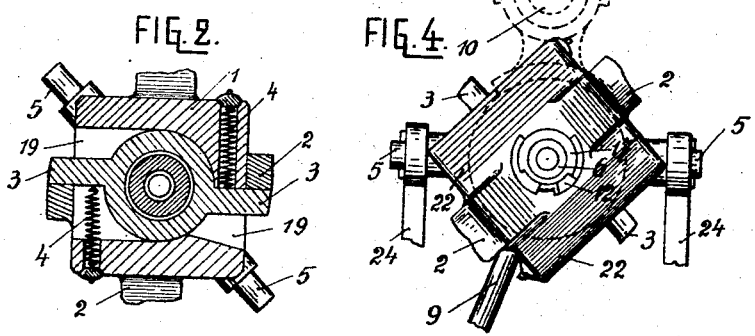
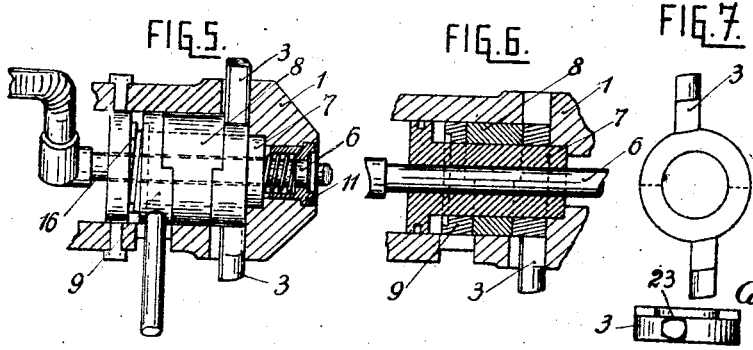
Inventor:
Carl Stollberg.
By William C. Linton
Attorney.

May 24, 1927.
C. STOLLBERG
1,629,551
COUPLING FOR RAILWAY CARS
Filed Jan. 23, 1926
2 Sheets-Sheet 2
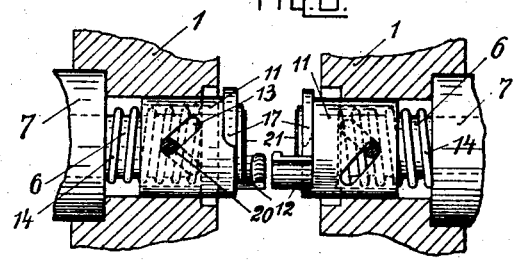
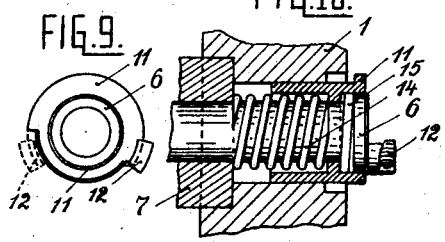
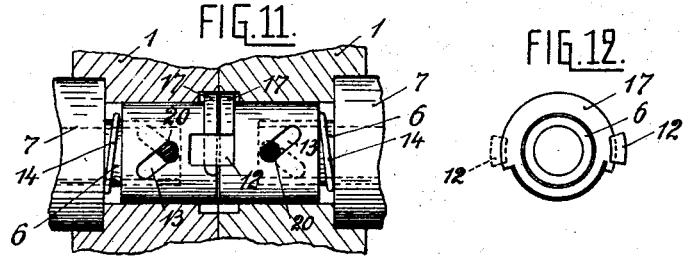
Inventor:
Carl Stollberg.
By William C. Linton.
Attorney.

Patented May 24, 1927.

UNITED STATES PATENT OFFICE.

CARL STOLLBERG, OF BERLIN, GERMANY.

COUPLING FOR RAILWAY CARS.

Application filed January 23, 1926, Serial No. 83,391, and in Germany February 3, 1925.

Rigid couplings for railway cars having heads for carrying passing-through working conduits and mains are already known which are provided with rigid coupling hooks and movable locking means operable from the side of the car and serving as a coupling pin.

These known couplings have the draw-back that the two cars connected together by means of said coupling are separated from each other as soon as one part only of the coupling breaks or does not work properly. A further great draw-back of these couplings is to be seen in this that the coupling for the ends of the conduits for braking and heating air is based upon spring action, so that a uniform and especially a reliable working is, of course, not to be obtained.

The object of the invention is to avoid all said draw-backs for which purpose the square-shaped coupling head is provided at its front end with two oblique surfaces and at two opposite lateral faces inclined under an angle of 45° to the vertical longitudinal middle plane of the coupling head with a fixed coupling hook, whereas the rear part of the coupling head carries a rotatable coupling bolt which is movable in rotary axial direction against the action of two springs. According to the invention each end of the conduits for the braking and heating air respectively is loosely enclosed by a sleeve which is provided with inclined slots coacting with bolts fixed to the coupling head and which carries at the ends facing each other a collar extending over half the circumference. The ends of said collar are inclined and carry a hook respectively. The hooks of both sleeves are situated beneath the horizontal diameter in the opened position of the coupling.

In the accompanying drawings the invention is illustrated by way of example.

Fig. 1 shows a plan inclined under an angle of 45° to the horizontal plane,

Fig. 2 is a cross section on line A—B of Fig. 1,

Fig. 3 is a side view of the closed coupling,

Fig. 4 is a face view of a coupling head,

Figs. 5-7 are part sectional views of the parts arranged in the coupling head,

Figs. 8-10 are part sectional views of the coupling device for the air conduit in the opened position and Figs. 11 and 12 are part sectional views of the couplings in closed position.

The square-shaped coupling head 1 carries fixed lateral coupling hooks 2 arranged at an angle of 45° to the vertical middle plane. In the rear part of the coupling head a bearing sleeve 7 is provided which is connected by means of a coupling member 8 to a switch lever 9 operable from the side of the car. The bearing sleeve 7 carries double locking members 3 which extend through inclined slots 19 in the coupling head 1 and are movable against the action of springs 4. Between the switch lever 9 and the collar of the bearing sleeve 7 a spring ring 16 serving as a counter-bearing is arranged.

At the coupling head 1 laterally projecting pins 5 are provided which are adapted to receive coupling eyes if the new coupling is used as a transition coupling.

In suitable bores in the middle of the coupling head the ends 6 of the conduits for the braking air are loosely arranged. The ends 6 extend through a slot 18 in the wall of the coupling head 1 and may outside the coupling head be connected to the flexible air conduit of the car. Loosely arranged around the ends 6 are coupling sleeves 11 the facing ends of which are provided with a collar 17 extending over half the circumference. The ends of said collar 17 are inclined. Furthermore these coupling sleeves 11 are provided each with a hook 12 and a slot 13. The slots 13 of said sleeves 11 are oppositely inclined. Each of these slots 13 serves the purpose of guiding a pin 20 fixed to the coupling head. Behind the collar 21 of the end 6 is arranged a spring ring 15 which finds a counter bearing in a hole of the coupling sleeve 11. Each of the ends 6 is surrounded by a coiled compression spring 14 which is arranged between the bearing sleeve 7 and the hole of the coupling sleeve 11.

As will be seen from Fig. 4 each of the coupling heads preferably carries a small trestle or block 10 in which are arranged coupling members similar to those in the coupling head and by means of which the conduits for the heating air are also connected together automatically.

Electric plugs may be arranged in any suitable manner on the coupling heads so that the electric-light mains of two cars are connected together as soon as the two cars are coupled.

The new coupling works as follows:

If two cars provided with the new coupling are moved against each other the fixed coupling hooks 2 slide along the inclined surfaces 22 and are thereby brought into the correct coupling position. The front ends of the coupling hooks displace the double locking member 3 against the action of the springs 4 in its slots 19, until at last the hooks 2 slide over the end of the double locking member 3 with which they are in contact, whereupon the double locking member 3 under the action of the springs 4 is safely held in its new position behind the hooks 2. If now shocks of the car occur the coupling is safely held against an undesired opening by the cooperation of the rounded surfaces 23 of the double locking member 3, the inclined slots 19 and the springs 4.

During such coupling of the cars the sleeves 11 provided at the ends 6 of the conduits are moved against each other, so that these sleeves are displaced in the longitudinal direction of the coupling head. On account of the inclined slots 13 and the pins 20 fixed to the coupling head the coupling sleeves 11 are rotated against each other, so that the hooks 12 slide over the corresponding inclined collars 17 of the sleeves 11 whereby the ends of the conduits are firmly connected to each other.

Suitable packing discs are, of course, provided at the ends of the conduits for preventing the escape of air. The spring ring 15 prevents a quick wearing off of the packing discs while the compression springs 14 surrounding the coupling sleeves 11 hold the single members of the opened coupling in the position ready for effecting the coupling.

Movements of the coupling heads during running of the cars which may be enlarged by wearing off of the parts coacting with each other have no bad influence whatever upon the tightening of the ends of the conduit as the slight possibility of movement of the coupling heads rigidly connected to each other may only result in a sliding of the hooks 12 upon the collar 17 without reducing the pressure upon the packing discs.

The coupling for the conduit of the heating air works in the same manner as that of the conduit for the braking air. The above described coupling for the conduit of the heating air has still that advantage that the small trestle 10 for the reception of the heating air-coupling parts need only be provided if the coupling is to be used in connection with cars to be heated.

What I claim is:

1. In combination with a pair of coupling heads, air couplers mounted therein comprising conduits, sleeves mounted on the conduits for partial rotation and locking devices interengaging in the rotation of said sleeves to lock the ends of the conduits in engagement.

2. In combination with a pair of coupling heads, air couplers mounted therein comprising conduits, sleeves mounted on the conduits for partial rotation upon engagement of the ends of the conduits and interlocking elements carried by the sleeves, interlocking during substantially the entire partial rotation of the sleeves.

3. In combination with a pair of coupling heads, air couplers mounted therein comprising conduits mounted therein for displacement, sleeves mounted on the conduits for rectilinear and arcuate movement, pins carried by the heads and engaging slots in the sleeves for accommodating the movement of said sleeves, collars mounted on the sleeves and having cam shaped extremities, springs mounted on the conduits and exerting a pressure against said sleeves and hooks projecting from said sleeves and adapted to interlock with said collars in the movements of the sleeves upon the conduits.

In witness whereof I have hereunto set my hand.

CARL STOLLBERG.